United States Patent Office 3,477,230
Patented Nov. 11, 1969

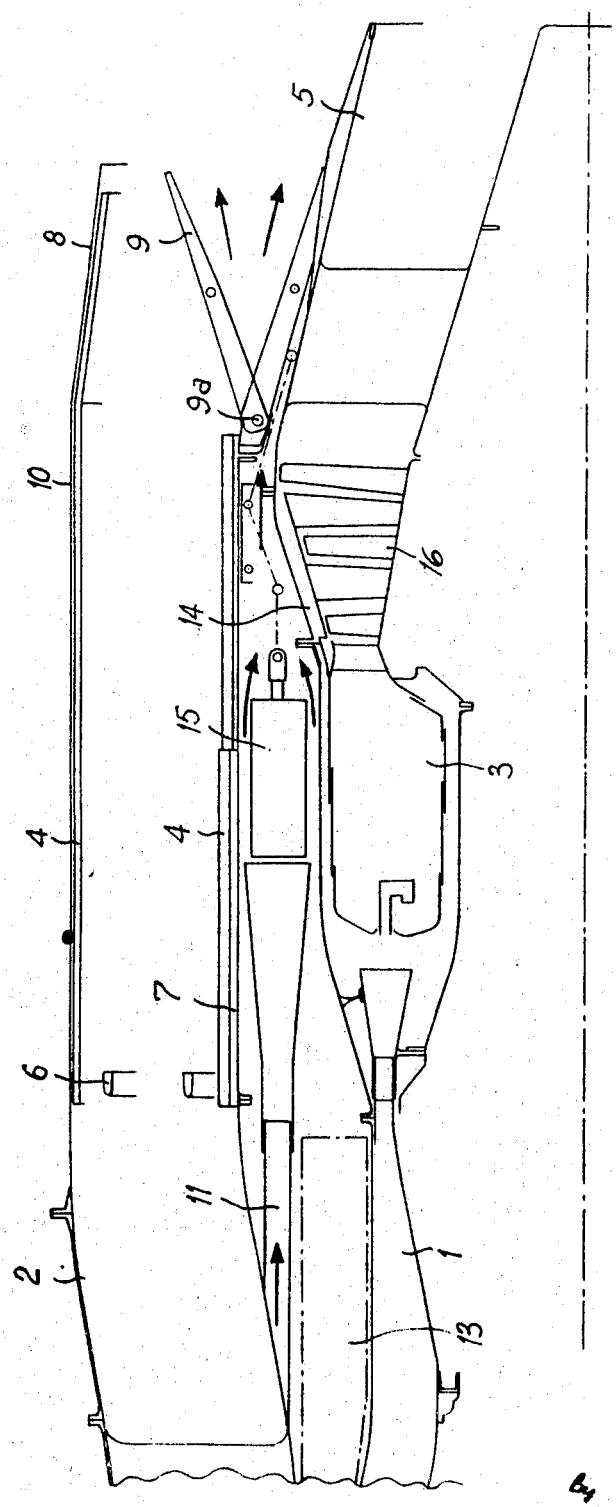

3,477,230
TURBO-JET ENGINES AND OTHER JET ENGINES OF THE DUAL-FLOW TYPE
Louis Jules Bauger, Vanves, Hauts-de-Seine, and Armand Jean Baptiste Lacroix, Itteville, Essonne, France, assignors to Societe National d'Etude et de Construction de Moteurs d'Aviation, Paris, France, a company of France
Filed July 24, 1967, Ser. No. 655,529
Claims priority, application France, July 28, 1966, 71,318
Int. Cl. F02k 3/02
U.S. Cl. 60—224                      2 Claims

ABSTRACT OF THE DISCLOSURE

Dual-flow jet engine comprising a gas turbine disposed in a central primary duct surrounded by an annular secondary duct, flaps movably mounted on the internal wall of the secondary duct and a duct for tapping off air from the secondary duct and injecting said air in the turbulent zone behind said flaps.

---

The invention relates to multiple flow jet engines of the combined turboramjet type and of the dual-flow "turbofan" type which are equipped with a device for reheating the cold flow deriving from the entry diffuser or produced by the low pressure compressor of the engine and fed into a secondary annular passage surrounding the central primary duct in which the gas turbine is located. The invention relates more particularly to "separate flow" jet engines in which the cold secondary flow and the hot primary flow leaving the turbine are ducted separately, the two flows existing from separate nozzles.

It is an object of the invention to bring about certain improvements in separate flow jet engines of this type, which have cold flow reheat facilities, thus to improve the performance and control characteristics of these engines.

In accordance with the invention, the secondary annular passage or duct through which the cold flow (possibly reheated) flows, discharges through an independent annular duct of variable cross-section, such variation being effected by means of flaps arranged on the inside wall of said secondary passage and designed to be extended in the direction of the outside wall of the duct in order to throttle the flow section in the passage in a known manner, air tapped off from this same secondary passage upstream of the reheat means which it contains being conducted to a re-injection point downstream of said control flaps in the turbulent region behind them.

The following description with respect to the accompanying drawing will indicate by way of a non-limitative example, how the invention may be put into effect, the further features appearing both in the drawing and the description thereof forming subordinate aspects of the invention.

In the drawing, the single figure is a schematic axial half-section of the rear part of an improved jet engine in accordance with the invention.

The jet engine illustrated in the drawing in the usual manner incorporates a central primary duct 1 and an annular secondary duct 2. The primary duct 1 contains the gas turbine and 3 indicates the combustion chamber of the latter, 16 the turbine proper; this duct discharges through a central nozzle 5. The secondary duct 2, which is equipped with reheat burners 6 and is delimited by an internal wall 7 and an external wall constituted by the casing 10 of the machine, discharges through an annular nozzle 8 which is independent of the central primary nozzle 5. The annular nozzle 8 is equipped with flaps 9 for controlling the flow cross-section, these flaps being articulated at 9a to the internal wall 7 to pivot towards and away from the external wall 10 and being of the known "partially overlapping" type.

The secondary duct 2 passes a flow of cold air deriving from the entry diffuser or the low pressure fan or compressor, neither of which has been shown but which are situated towards the left of the drawing. The internal wall 7 and the external wall 10 of this duct 12 are provided with liners 4 which perform refractory and anti-vibratory functions.

The burners 6 are situated downstream of the jet engine components 13, which are arranged between the two flows 1 and 2. This disposition is necessary in order to avoid problems associated with flame heat radiation. The variable section duct 8 enables the exit section to be selected in accordance with whether the machine is operating with or without reheat of the cold flow, whilst the provision of such variability enables the external wall 10 of the duct 2 to be made smaller in size at the downstream end; this considerably reduces the rear-end drag.

Dilution air is tapped off from the duct 2 upstream of the burners 6 and routed through a conduit 11 outside the gas turbine 3, 16 to the nozzles. This dilution air is intended to make up for the turbulence created between the two flows in accordance with various positions of the flaps 9 in the nozzle 8. In transit, this air also cools certain components 13 of the machine such as the turbine blade rings 14, the hydraulic control rams 15 for the flaps 9 of the nozzle 8, and these flaps themselves.

It also helps to render the engine safe by carrying outside any escaping oil or fuel which could possibly accumulate between the two flows.

The arrangement of the flaps on the internal wall of the secondary duct has a dual advantage as against their arrangement on the external wall thereof. On the one hand, the rear-end drag produced by the external wall of the annular nozzle is reduced and on the other hand a saving in terms of weight and size is achieved since an arrangement of this sort requires a smaller number of flaps.

The invention which has been above described in application to a convetional turbo-jet engine of the dual-flow type, is not in fact limited to this kind of machine and is equally applicable to other multiple-flow machines such as a combined turboramjet engine.

In this kind of application, two possible modes of operation are conceivable:

(1) Operation using turbo-jet engine alone, with reheat of the secondary flow produced by the low pressure compressor.

(2) Operation without turbo-jet engine and reheat of the secondary flow, the latter instead deriving directly from the entry diffuser and the turbo-jet engine being stopped and blocked off at entry and exit.

We claim:
1. A dual-flow jet engine comprising a gas turbine disposed in a central primary duct surrounded by an annular secondary duct, said two ducts discharging through independent nozzles, a reheat device for the cold flow passing through said secondary duct, flaps movably mounted on the internal wall of said secondary duct and designed to project to a varying extent in the direction of the external wall of said secondary duct in order to vary the cross section of said secondary duct and thus to throttle the flow through the nozzle of said secondary duct, and means for tapping off air from said secondary duct at a point upstream of the reheat system for injecting such air downstream between said flaps and said central primary duct only during projection of said flaps in the direction of said external wall, thereby reducing the turbulence between the flow from said primary and said secondary ducts.

2. A jet engine as claimed in claim 1, in which said means for tapping air from said secondary duct is a conduit located on said internal wall.

References Cited

UNITED STATES PATENTS 3,269,114   8/1966   Marchant _____ 60—226

FOREIGN PATENTS 634,860   2/1962   Italy.

CARLTON R. CROYLE, Primary Examiner

DOUGLAS HART, Assistant Examiner